United States Patent
Kishida et al.

(10) Patent No.: US 6,429,804 B1
(45) Date of Patent: Aug. 6, 2002

(54) MOTOR-VEHICLE-MOUNTED RADAR APPARATUS

(75) Inventors: Masayuki Kishida; Daisaku Ono; Hirofumi Higashida, all of Kobe (JP)

(73) Assignee: Fujitsu Ten Limited, Kobe (JP)

( * ) Notice: Subject to any disclaimer, the term of this patent is extended or adjusted under 35 U.S.C. 154(b) by 13 days.

(21) Appl. No.: 09/717,153

(22) Filed: Nov. 22, 2000

(30) Foreign Application Priority Data

Nov. 24, 1999 (JP) .......................................... 11-333058

(51) Int. Cl.7 .............................................. G01S 13/93
(52) U.S. Cl. ............................. 342/70; 342/71; 342/72; 342/99; 342/123; 342/128; 342/146; 340/903; 340/435; 340/436
(58) Field of Search ............................. 342/70, 71, 72, 342/90, 99, 118, 123, 128, 129, 133, 139, 146, 159; 340/903, 905, 933, 435, 436; 701/300, 301

(56) References Cited

U.S. PATENT DOCUMENTS

| | | | |
|---|---|---|---|
| 4,348,675 A | * 9/1982 | Senzaki et al. | 342/71 |
| 5,268,692 A | * 12/1993 | Grosch et al. | 342/70 |
| 5,940,024 A | * 8/1999 | Takagi et al. | 342/70 |
| 6,094,158 A | * 7/2000 | Williams | 342/70 |
| 6,317,073 B1 | * 11/2001 | Tamatsu et al. | 342/70 |
| 2001/0037165 A1 | * 11/2001 | Shirai et al. | 701/1 |
| 2002/0005778 A1 | * 1/2002 | Breed et al. | 340/435 |

FOREIGN PATENT DOCUMENTS

| | | |
|---|---|---|
| JP | 55-111395 | 8/1980 |
| JP | 07-120549 | 5/1995 |
| JP | 08-082679 | 3/1996 |
| JP | 09-080148 | 3/1997 |
| JP | 09-145824 | 6/1997 |
| JP | 52-111395 | 9/1997 |
| JP | 10-282220 | 10/1998 |
| JP | 11-038141 | 2/1999 |
| JP | 11-064499 | 3/1999 |
| JP | 11-072651 | 3/1999 |
| JP | 11-084001 | 3/1999 |
| JP | 11-231053 | 8/1999 |

* cited by examiner

Primary Examiner—John B. Sotomayor
(74) Attorney, Agent, or Firm—Oliff & Berridge, PLC

(57) ABSTRACT

A target 22 is explored by transmitting an exploration signal 40 at a certain angle while scanning an antenna 23. In the go and return exploration the angle for transmitting the exploration signal is shifted. It is possible to detect the direction of the target 22 with the same accuracy as that in exploration with a more minute angle difference, by combining the exploration results with the angle shifted in a plurality of scans. Relative travel of the target 22 that accompany a plurality of scans is considered as a Doppler shift and a combination of data is used considering the frequency shift. Data that cannot be combined is treated as an unwanted reflective object and the position where unwanted reflecting objects assemble is obtained and the position is determined as a shoulder. The height of a stationary target is determined from the variation in the reflected signal level in an approach to the stationary target.

19 Claims, 14 Drawing Sheets

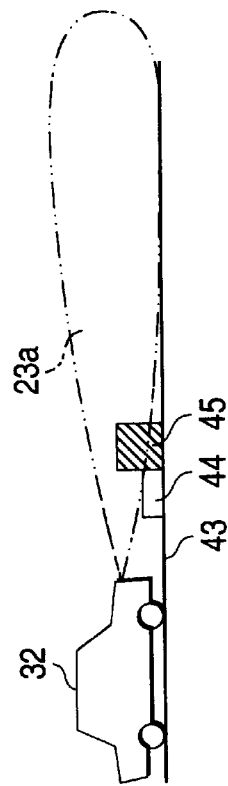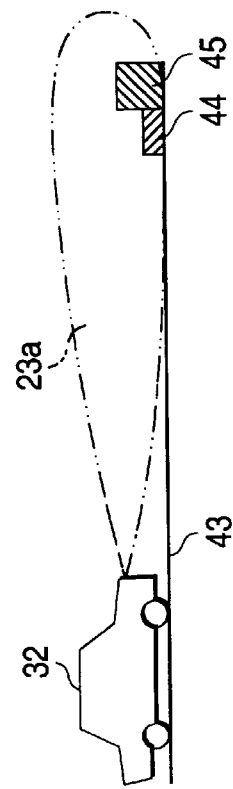

MOTOR-VEHICLE-MOUNTED RADAR APPARATUS

BACKGROUND OF THE INVENTION

1. Field of the Invention

The present invention relates to a motor-vehicle-mounted radar apparatus mounted on a vehicle and used to explore obstacles such as other vehicles traveling around the vehicle, for example, ahead of the vehicle, as targets thus securing safety of driving.

2. Description of the Related Art

Conventionally, motor-vehicle-mounted radar apparatus that explores obstacles of a vehicle in the direction of traveling has been developed. As motor-vehicle-mounted radar apparatus, the FM-CW system is employed in which an exploration wave as a continuous sending wave frequency-modulated using a triangular wave as a modulating wave and a beat component caused by a reflected wave from a target are extracted as a beat signal, and the relative velocity and relative range to the target are obtained based on the frequency of the beat signal. Related arts concerning the FM-CW system radar apparatus are disclosed, for example, in the Japanese Patent Laid-Open No. 111395/1977, the Japanese Patent Laid-Open No. 120549/1995, the Japanese Patent Laid-Open No. 80184/1997 and the Japanese Patent Laid-Open No. 145824/1997. Especially in the Japanese Patent Laid-Open No. 120549/1995, a configuration is disclosed whereby the radiation direction of a beam-shaped radio wave transmitted from motor-vehicle-mounted radar apparatus can be changed in order to correctly explore a target such as a vehicle traveling diagonally ahead for example in curvilinear traveling.

FIG. 16 shows a schematic configuration of conventional motor-vehicle-mounted radar apparatus of the FM-CW system 1. The motor-vehicle-mounted radar apparatus 1 explores a target 2 and transmits a radio wave for exploration from an antenna 3 in order to calculate the range to the target 2 and the relative velocity to the target 2. The antenna 3 receives the reflected radio wave reflected off the target 2. The antenna 3 is formed in a beam shape having a sharp range whose gain is high. Thus it is possible to execute scanning with beam direction changed via a scanning mechanism 4 and to detect the direction of the target 2 from the direction of beam in receiving a reflected signal from the target 2. With the range to and direction of the target 2 obtained, the position of the target 2 can be relatively obtained based on the position of the vehicle.

In the exploration according to FM-CW system, a transmitter circuit 5 is used to give an exploration signal frequency-modulated by a triangular wave to the antenna 3 for transmission, a reflected signal received by the antenna 3 is amplifier and frequency-converted by a receiver circuit 6 and converted to a digital signal by an analog-to-digital (hereinafter referred to as A/D) converter circuit 7, then converted to a frequency component by a fast Fourier Transform (hereinafter referred to as FFT) circuit 8. An object detection circuit 9, based on the range R and the relative velocity V to the target 2 based on the frequency component from the FFT circuit 8.

Each of FIGS. 17A and 17B show a principle in which the object detection circuit shown in FIG. 16 explores the target 2 and calculates the range R and the relative velocity V in accordance with the FM-CW system. From the antenna 3 in FIG. 16, an exploration signal 10 for frequency-modulated continuous wave (CW) is transmitted so that frequencies maybe continuously varied on the triangular wave at a constant variation velocity. An exploration 10 wave reflects off the target 2 and a resulting reflected signal 11 that is received by the antenna 3 is delayed as long as the period corresponding to the range R from the exploration signal 10. This causes difference in frequencies for the exploration signal 10 whose frequency is in variation. The relative velocity V is generated to the target 2. Thus the Doppler shift effect is generated on the reflected signal 11, causing difference in frequency from the exploration signal 10.

In the FM-CW system, as shown in FIG. 17B, variation in frequency caused by the Doppler shift effect is reflected differently on an upbeat signal 12 as a beat signal in the frequency rise section where the frequency shift amount of frequency modulation is increasing, and on a downbeat signal 13 as a beat signal in the frequency drop section where the frequency shift amount of frequency modulation is decreasing. Thus the frequency fub of the upbeat signal 12 and the frequency fdb of the downbeat signal 13 can be represented as the following expressions 1 and 2 using the range frequency fr and the Doppler shit frequency fd that are standard beat signal frequencies.

$$fub=fr-fd \quad (1)$$

$$fdb=fr+fb \quad (2)$$

Here, the range frequency fr is in proportion to the range R to the target 2 and can be represented by the following expression 3 assuming the frequency shift amplitude of the exploration signal of the FM-CW system 10 as a triangular wave as $\Delta f$, modulating frequency as a triangular wave fm, and the velocity of light C. The Doppler shift frequency fd can be represented by the following expression 4 assuming the relative velocity to the target 2 as V and the wavelength of the exploration signal as $\lambda$. It is also possible to calculate the range R and the relative velocity V respectively from the range frequency fr and the Doppler shift frequency fd by using the expressions 3 and 4.

$$fr=4\times\Delta f\times fm\times R/C \quad (3)$$

$$fd=2V/\lambda \quad (4)$$

As shown in FIG. 16, related arts concerning the motor-vehicle-mounted radar apparatus that scans the beam direction of the antenna 3 are disclosed, for example, in the Japanese Patent Laid-Open No. 64499/1999, the Japanese Patent Laid-Open No. 72651/1999, the Japanese Patent Laid-Open No. 84001/1999 and the Japanese Patent Laid-Open No. 121053/1999. In the Japanese Patent Laid-Open No. 82673/1996, a configuration whereby the short range and long range are switched over for exploring a target. In the Japanese Patent Laid-Open No. 282220/1998, a related technology is disclosed whereby part of data obtained in radar exploration is used to identify a target for a radar for an airframe. In the Japanese Patent Laid-Open No. 38141/1999, a related art is disclosed whereby a mobile-vehicle-mounted radar is used to recognize an obstacle in a three-dimensional image.

Of the related arts that scan the beam direction of an antenna, for example in the Japanese Patent Laid-Open No. 84001/1999 and the Japanese Patent Laid-Open No. 231053/1999, a philosophy is described that a plurality of explorations are carried out in a single scan period and the target direction is estimated from the peak of the reflected signal level obtained according to the variation in beam direction. In order to upgrade the exploration accuracy of the exploration in the target direction using such a philosophy in the related arts, it is necessary to explore a target in more directions and to increase of the frequency of exploration. Such a method suffers from high load of operation processing so that special hardware for high-speed signal processing is required to process data at a high speed. High-speed signal processing has a problem of heat as well as costs. Smooth operation requires a corresponding circuit scale thus upsizing the system configuration.

A method is also available whereby the limits of angle of exploration in a specific section where a target is present is narrowed. This approach requires a complicated hardware configuration and has few merits in terms of costs.

In recognizing a target, it is necessary to prepare a complicated logic in order to extract a true target in case reflected signals from a guard rail, tunnel, or sound-proof wall is received. In the case of a guard rail, the relative velocity calculated after paring processing in which the frequency in the frequency rise section and the frequency in the frequency drop section according to the FM-CW system are combined does to equal the actual velocity of the vehicle. The target thus appears as a moving object, not a stationary object. The travel amount does not coincide with the value obtained from the relative velocity so that the target is determined as a guard rail based on such information. However, as the frequency of exploration increases, the data update rate is accelerated and travel amount is decreased. Thus the relative velocity obtained from the travel amount is less accurate and makes difficult the comparison of relative velocity.

Further, in the FM-CW system, while a combination of the frequency rise section and the frequency drop section is used to calculate the range and the relative velocity, the Doppler shift effect is large for an object approaching at a high relative velocity so that the difference in frequency is large between the frequency rise section and the frequency drop section. In the case of an approach to a target, the beat signal in the frequency rise section deviates to the lower frequency band and processing is difficult for an extremely low-frequency beat signal thus increasing the minimum range in which a target can be detected, compared with the stationary state. As a result, it is impossible to trace the approaching target and get information on whether the target is approaching or deviating in another direction.

In case targets detected during driving are determined as stationary objects, they include objects that the vehicle can clear or pass through. Conventionally, these objects are not under specific criterion but subject to alarms or deceleration control. While a stationary objects may not be determined as a target but excluded from the target of control for these objects, objects that cannot be cleared or passed through cannot be excluded from the target of control.

SUMMARY OF THE INVENTION

An object of the invention is to provide motor-vehicle-mounted radar apparatus that can correctly recognize the position and nature of the target.

In the invention, there is provided a motor-vehicle-mounted radar apparatus that is mounted on a vehicle for exploring targets around the vehicle, characterized in that the apparatus comprises:

an antenna formed to have a high gain in a predetermined beam direction, for transmitting an exploration signal in the beam direction and receiving a reflected signal from a target of the exploration signal, scanning means for performing a scan that varies the beam direction of the antenna within predetermined limits, direction detecting means for detecting the beam direction varied by the scanning means, exploration control means for making control to scan repeatedly in the beam direction of the antenna via the scanning means within the predetermined limits and to explore targets in a plurality of beam directions detected by the direction detecting means, each direction making an angle with each other every time exploration is made, and target recognizing means for calculating the range to a target based on the reflected signal from the target received by the antenna and the exploration signal transmitted from the antenna and for recognizing the target based on the range and the beam direction of the antenna detected by the direction detecting means.

According to the invention, the motor-vehicle-mounted radar apparatus that is mounted on a vehicle for exploring targets around the vehicle transmits an exploration signal in a predetermined beam direction from an antenna and receives a reflected signal from a target. The beam direction of the antenna is varied within predetermined limits by scanning means in a scan and detected by direction detecting means. Exploration control means makes control to scan repeatedly in the beam direction of the antenna via the scanning means within the predetermined limits and to explore targets in a plurality of beam directions detected by the direction detecting means, each direction making an angle with each other every time exploration is made. Target recognizing means calculates the range to a target based on the reflected signal from the target received by the antenna and the exploration signal transmitted from the antenna. Target recognition is made based on the range and the beam direction of the antenna detected by the direction detecting means. Since a plurality of beam directions that are different from antenna scan to antenna scan is obtained by exploration control means, a combination of exploration results obtained from a plurality of explorations assures as high accuracy in exploration as the results obtained from explorations made in beam directions making a smaller angle with each other. Since an angle between beam directions in explorations during a single scan may be larger than a final angle, the target direction can be determined at an accuracy similar to that in a high-speed processing.

The invention is characterized in that the target recognizing means recognizes a target based on the results of explorations in a plurality of beam directions per scan and recognizes the target based on a combination of exploration results obtained from a plurality of prespecified scans when the number of beam directions of a reflected signal is smaller than a prespecified reference value.

According to the invention, recognition of a target can be made based on exploration results obtained from a plurality of scans in case a sufficient number of exploration results cannot be obtained via a single scan. This can upgrade the target recognition accuracy.

The invention is characterized in that the target recognizing means calculates a Doppler shift frequency from frequency shift amount that accompanies traveling of a target based on exploration results obtained from the plurality of scans and varies reflected signals to be combined for target recognition depending on the calculation results.

According to the invention, it is possible to combine candidate exploration results considering time delay between a plurality of scans in order to perform high-accuracy recognition.

The invention is characterized in that the target recognizing means recognizes reflected signals having frequencies excluded from the combination depending on the exploration results as reflected signals from unwanted reflecting objects, not as reflected signals from a target.

According to the invention, reflected signals having frequencies that cannot be combined among a plurality of exploration results are recognized as reflected signals from unwanted reflecting objects, not as reflected signals from a target. Thus it is possible to avoid burdening the system with load of processing on a target that need not pay attention to and perform processing focused on a target that need to pay attention to.

The invention is characterized in that the target exploration is performed via the FM-CW system and that the target recognizing means subtracts the Doppler shift component of the velocity of the vehicle from the peak data obtained from reflected signals having frequencies excluded from the combination depending on the exploration results in the frequency rise section and the frequency drop section of the FM-CW system in order to calculate the range and the direction.

According to the invention, the Doppler shift component of the velocity of the vehicle is subtracted in the frequency rise section and the frequency drop section of the FM-CW system in order to calculate the range and the direction even if the exploration results are excluded from the combination for a specific target. This allows the position of a target to be explored efficiently.

The invention is characterized in that the target recognizing means recognizes the calculation results of the range and direction as data on unwanted reflecting objects and obtains the position where unwanted reflecting objects assemble from the range and the direction, and determines the position as a shoulder.

According to the invention, the calculation results based on exploration results that could not be combined are recognized as data on unwanted reflecting objects and the position where unwanted reflecting objects assemble is determined as a shoulder Thus, an object that is on or beyond the shoulder can be excluded from attention in order to reduce processing load.

In the invention, there is provided a motor-vehicle-mounted radar apparatus that is mounted on a vehicle for exploring targets around the vehicle, characterized in that the apparatus comprises:

an antenna formed to have a high gain in a predetermined beam direction, for transmitting an exploration signal in the beam direction and receiving a reflected signal from a target of the exploration signal, and target recognizing means for calculating the range to a target based on the reflected signal from the target received by the antenna and the exploration signal transmitted from the antenna, for recognizing the target based on the range and the beam direction of the antenna detected by the direction detecting means, and for determining the height of the stationary target depending on whether or not a multipath error has effects on the variation in the reflected signal level within a specific frequency limits caused by the range from the target.

According to the invention, it is determined whether or not the target can be cleared based on the variation in the level of the reflected signal from the target caused by the range from the target. The reflected signal from the target is either a signal directly received by the antenna or a signal reflected off a road surface and received by the antenna. These signals generate a phase difference based on the path difference of the reflected signals thus varying the level of a signal received by the antenna. When the target is low, variation in the level of a reflected signal is small and the possibility of clearing the target is high. Since it is determined whether or not the target can be cleared based on a variation in the level of a reflected signal caused by the range from the target, a secure decision is possible via a simple configuration. A reflected signal from a target on the road surface on which the vehicle is traveling passes through a plurality of paths, i.e., a path directly reaching the antenna and a path once reflected off the road surface and reaching the antenna, and thus received in a state where a phase difference based on the path difference is generated. Phase difference occurs between reflected signals received in such a multipath error. Thus a phase difference close to 180 degrees results in a large signal attenuation. Since such effects caused by a multipath error appear depending on the height of a target, it is possible to properly determine the height of a stationary target based on the effects of multipath error.

The invention is characterized in that the target recognizing means determines that the stationary target can be cleared in case the level of the reflected signal from the target suddenly drops in an approach to the target.

According to the invention, it is determined that the target can be cleared in case the level of the reflected signal from the target suddenly drops in an approach to the target. Since the target that can be cleared has a small height from the road surface and goes beyond the beam direction limits of the antenna when the range to the antenna becomes smaller, the level of the reflected signal suddenly drops. Thus, in case the level of the reflected signal from the target suddenly drops in an approach to the target, it is highly possible that the target is at least lower than the antenna position and thus can be cleared.

The invention is characterized in that the target recognizing means has data indicating the variation in the threshold value of the reflected signal level for the range in advance and determines that the stationary target can be cleared in case the level of the reflected signal from the target has dropped below the threshold value within a predetermined limits of range.

According to the invention, a map is formed indicating the variation in the threshold value of the reflected signal level for the range in advance. Thus, in case the level of the reflected signal in an approach to the target has dropped below the threshold value, it can be determined that the stationary target is low and can be cleared.

In the invention, there is provided a motor-vehicle-mounted radar apparatus that is mounted on a vehicle for exploring targets around the vehicle, characterized in that the apparatus comprises:

an antenna formed to have a high gain in a predetermined beam direction, for transmitting an exploration signal in the beam direction and receiving a reflected signal from a target of the exploration signal, and target recognizing means for calculating the range to a target based on the reflected signal from the target received by the antenna and the exploration signal transmitted from the antenna, for recognizing the target based on the range and the beam direction of the antenna detected by the direction detecting means, the target recognizing means having data indicating the variation in the threshold value of the reflected signal level for the range in advance and determines that the height of the target based on the range where the reflected signal from the stationary target has dropped below the threshold value.

According to the invention, the range where the reflected signal level drops below the threshold value while the user's car is approaching the stationary target corresponds to the height of the stationary target. Thus it can be determined that the target is low in case the reflected signal level drops at relatively long range and gets higher as the level drops at relatively short range.

The invention is characterized in that the target recognizing means determines whether or not the stationary target can be cleared based on the state in which the reflected signal level drops as the range gets shorter.

According to the invention, it is determined that the target can be cleared in case the reflected signal level has dropped above a certain extent in an approach to the target from the level at long range. This evades the effects of a variation in the reflected signal level caused by difference of target material.

In the invention, there is provided a motor-vehicle-mounted radar apparatus that is mounted on a vehicle for exploring targets around the vehicle, characterized in that the apparatus comprises:

an antenna formed to have a high gain in a predetermined beam direction, for transmitting an exploration signal in the beam direction and receiving a reflected signal from a target of the exploration signal, and target recognizing means for calculating the range to a target based on the reflected signal from the target received by the antenna and the exploration signal transmitted from the antenna, for recognizing the target based on the range and the beam direction of the antenna detectedby the direction detecting means, and for determining the height of the stationary target based on the range where the reflected signal level suddenly drops in an approach to the target.

According to the invention, the height of a stationary target is estimated depending on the range where the reflected signal level has dropped below a certain level in an approach to the stationary target compared with the level at long range. When the stationary target is relatively low, the target goes beyond the beam limits from the antenna at relatively long range thus avoiding a drop in the reflected signal level. In case the target is relatively high, the drop in the reflected signal level becomes large at short range. Since the reference level used to evaluate the drop in the reflected signal level is the reflected signal level from the target at long range, effects such as the target material can be reduced to estimate the target height at a high accuracy.

In the invention, there is provided a motor-vehicle-mounted radar apparatus that is mounted on a vehicle for exploring targets around the vehicle, characterized in that the apparatus comprises:

an antenna formed to have a high gain in a predetermined beam direction, for transmitting an exploration signal in the beam direction and receiving a reflected signal from a target of the exploration signal, and target recognizing means for calculating the range to a target based on the reflected signal from the target received by the antenna and the exploration signal transmitted from the antenna and for recognizing the target based on the range and the beam direction of the antenna detected by the direction detecting means, the target recognizing means recognizing that the target is not a target having a height to be alerted for a traveling vehicle in case the reflected signal level that is recognized exceeds the prespecified reference while the target recognizing means is recognizing the stationary target at longer range than the predetermined range and the reflected signal level drops considerably as the vehicle approaches the target from the vehicle position at the time of recognition.

According to the invention, it is recognized that the target is not a target having a height to be alerted for a traveling vehicle in case the reflected signal level that is recognized exceeds the prespecified reference while the stationary target at longer range than the predetermined range is recognized and the reflected signal level drops considerably as the vehicle approaches the target from the vehicle position at the time of recognition. For example, in case a reflected signal is received from an object, such as a billboard, a sign, and a two-level crossing, above the road surface on which the vehicle is traveling, the target is within the antenna beam direction limits at a distance but goes beyond the antenna beam direction limits as the vehicle approaches the target and causing the reflected signal level to drop considerably. When such an object as will not interfere with the traveling of the vehicle is detected, the object is recognized as a target not to be alerted. This eliminates control such as unnecessary alert or braking.

The invention is characterized in that the target height is the height of the highest section of the target.

According to the invention, it is possible to determine the possibility of clearing the target from the height of the highest section of the target.

The invention is characterized in that the target recognizing means determines whether or not the target can be cleared based on the determined height.

According to the invention, it is possible to determine whether or not the target can be cleared from the height of the highest section of the target. This assures a correct decision.

The invention is characterized in that the target height is the height of the lowest section of the target.

According to the invention, it is possible to determine the possibility of passing through the target from the height of the lowest section of the target.

The invention is characterized in that the target recognizing means determines whether or not the target can be passed through based on the determined height.

According to the invention, it is possible to determine whether or not the target can be passed through from the height of the lowest section of the target. This assures a correct decision.

The invention is characterized in that the target recognizing means determines the target height in a plurality of sections depending on the range from the target and derives a signal for predetermined alarm and/or braking based on the decision results for each section.

According to the invention, the target height is determined based on the presence/absence of the effects of a multipath error in a plurality of sections in an approach to a stationary target. Thus it is possible to make a plurality of decisions in an approach to the target and to avoid unnecessary alarm or braking in case it is determined that the target can be cleared in an early period.

The invention is characterized in that the target exploration is performed via the FM-CW system and that the target recognizing means uses only data in the frequency drop section to estimate the range and the relative velocity to the target when the target recognizing means determines that the relative velocity to the target is larger than the reference velocity.

According to the invention, it is possible to perform an highly accurate detection of a target that is rapidly approaching.

BRIEF DESCRIPTION OF THE DRAWINGS

FIGS. 10A and 10B are diagrams showing the principle whereby it is possible to determine whether or not a stationary target can be cleared depending on a drop in the reflected signal level in an approach as the sixth embodiment of the invention.

DETAILED DESCRIPTION OF THE PRESENT INVENTION

Figure 1:
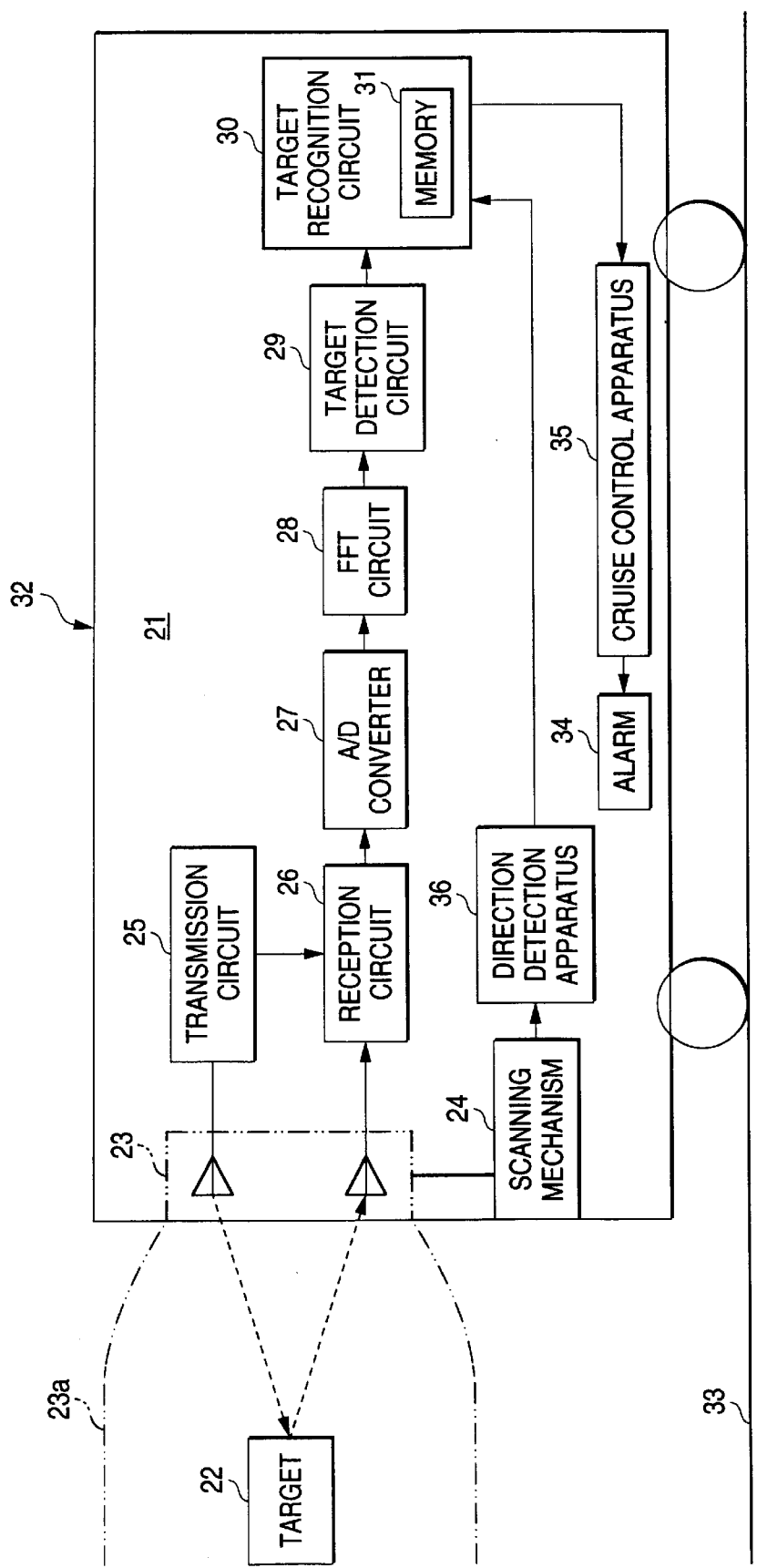
FIG. 1 is a block diagram showing a schematic configuration of motor-vehicle-mounted radar apparatus 21 used in embodiment of the invention.

FIG. 1 shows a schematic electrical configuration of motor-vehicle-mounted radar apparatus 21 used in embodiments of the invention. The motor-vehicle-mounted radar apparatus 21 has an antenna 23 for exploring a target 22. The antenna 23 has a bean direction 23a variable in the horizontal plane via a scanning mechanism 24. The scanning mechanism 24 can swing the beam direction 23a of the antenna 23 within certain angle limits from the direction of the traveling of the vehicle.

From the antenna 23, a radio wave of the FM-CW system is transmitted as an exploration signal. When the exploration signal reaches the target 22, it reflects off the surface of the target 22 and becomes a reflected signal. When the reflected signal is received by the antenna 23, a beat signal generated between the reflected signal and the exploration signal is electrically processed by a receiver circuit 26, and converted to a digital signal by an A/D converter circuit 27, and the frequency component is extracted by an FET circuit 28. An object detection circuit 29 detects an object corresponding to the target 22 based on the frequency component extracted by the FET circuit 28. An object recognition circuit 30 recognizes the target 22 based on the detection results of the object in a plurality of exploration directions in a single scan and the detection results of the object in a plurality of scans. A plurality of exploration results in a single scan and the exploration results in a plurality of scans are stored in a memory 31.

The motor-vehicle-mounted radar apparatus 21 is mounted on a vehicle 32 and the position of the antenna 23 is higher than a road surface 33 on which the vehicle 32 is traveling. Recognition results obtained by the object recognition circuit 30 of the motor-vehicle-mounted radar apparatus 21 are given to alarm apparatus 34 and cruise control apparatus 35. The alarm apparatus 34 issues an alarm when the range to the target is shorter than the predetermined range thus causing a danger of collision. The cruise control apparatus 35 makes control to brake the vehicle 32 when it is determined that the range to the target 22 is short considering the relative velocity in order to lower the traveling velocity. The cruise control apparatus 35 makes control to continue traveling at a prespecified velocity in case braking is unnecessary. The beam direction 23a of the antenna 23 can be detected by direction detecting apparatus 36.

Figure 2:
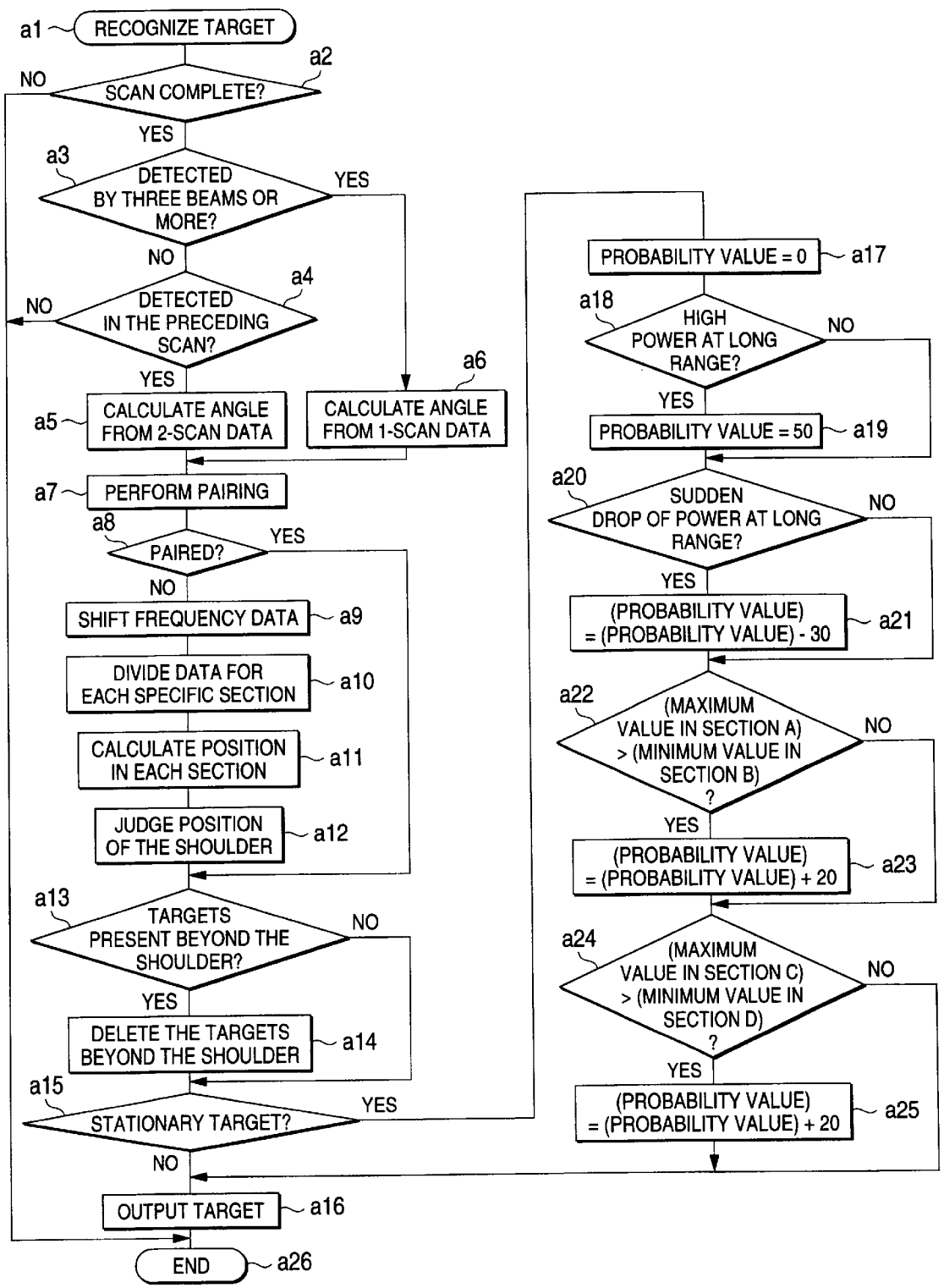
FIG. 2 is a flowchart showing the operation procedure of an object recognition circuit 30 as the first embodiment of the invention.

FIG. 2 shows the processing procedure of the object recognition circuit 30 as the first embodiment of the invention. When a target is recognized, the procedure from step a1 starts. In step a2, it is determined whether or not a single scan of the antenna 23 by the scanning mechanism 24 is complete. In case it is determined that the scan is complete, it is determined whether or not a reflected signal from the target 22 is detected via at least three beams of the antenna 23 with a beam direction 23a facing a single direction while sending an exploration signal in step a3. In case it is determined that the reflected signal is not detected via at least three beams, it is determined whether or not the target recognized in the preceding scan is detected in step a4. In case the target is not detected, execution returns to step a2. In case it is determined that the target 22 detected in the preceding scan is recognized, the beam angle is calculated from the preceding and current scan data in step a5. In case it is determined that the reflected signal is detected via at least three beams in step a3, the beam angle is calculated from the data in a single scan.

When the calculation processing in step a5 or step a6, pairing is performed in step a7. In the pairing the frequency rise section and the frequency drop section of the FM-CW system are combined. In step a8, it is determined whether or not pairing was possible in step a7. In case it is determined that pairing was not possible, frequency data is shifted in step a9 and the data is divided by specific section, the position in each section is calculated in step a11, and the shoulder position is determined in step a12. Concerning the data for which pairing was possible in step a8, steps a9 through a12 are skipped. Details of steps a9 through a12 are described later.

In step a13, it is determined whether or not a target is present beyond a shoulder. In case it is determined that a target is present, the target beyond the shoulder is deleted in step a14. In case it is determined that a target is not present beyond the shoulder in step a13, or in case step a14 terminates, it is determined whether or not a stationary target in stationary state is present. In case it is determined that a stationary target is not present, a signal to represent the target recognition results is output in step a16.

In case it is determined that a stationary target is present in step a15, the probability of clearing the stationary target is calculated in step a17 and the subsequent steps. In step a17, the probability value is initialized to 0. In step a18, it is determined whether or not the power as a receiving intensity of the stationary target at long range is high. In case it is determined that the power is high, the probability value is set to 50 in step a19. In case the power at long range is high, it is determined that the stationary target is high from the road surface and the possibility of not clearing the object is high when the vehicle continues to travel, and the probability value is set to 50. In case it is determined that the power is not high at long range in step a18, or in case step a19 terminates, it is determined whether or not the power suddenly drops while the vehicle is at relatively long range in step a20. In case it is determined that the power suddenly drops, the probability of the stationary target present at a relatively high position, such as a billboard and the possibility of not clearing the target drops, thus the probability value is decreased by 30 in step a21.

In case it is determined that the power does not suddenly drop while the vehicle is at relatively long range in step a20, or in case step a21 terminates, execution proceeds to step a22. In step a22, it is determined whether or not the power as a receiving signal strength varies as the range becomes shorter and the maximum value in Section A is larger than the minimum value in the next Section B. In case the receiving signal level varies due to a multipath error, the relationship as shown in step a22 is established reflecting the cycle of variation, then execution proceeds to step a23. In step a23, the probability value is increased by 20. In case it is determined that the relationship is not established in step a22, or in case step a23 terminates, execution proceeds to step a24. In step a24, it is determined whether or not the maximum value in the Section C next to the Section B in step a22 is larger than the minimum value in the next Section D. In case it is determined that the conditions in step a24 is established, the probability value is increased by 20 in step a25 In case it is determined that the conditions in step a24 is not established, or in case step a21 terminates, execution proceeds to step a16 and the calculated probability value is output to the alarm apparatus 34 and the cruise control apparatus 35 in FIG. 1.

Same as determining via comparison between the "maximum value" in a section and the "minimum value" in an adjacent section, a sudden drop in the power can be determined according to the "maximum dispersion" and the "deviation from the mean value."

After the target has been output in step a16, or in case it is determined that a single scan is not complete in step a2, execution proceeds to step a26 and the procedure terminates. In case it is determined that a single scan is not complete in step a2, exploration of a target is performed until a single scan terminates, and in case a reflected signal is detected, the target is recognized. In the next scan, the beam angle is shifted by predetermined angle. It is also possible to perform three or more scans to interpolate the beam angle more minutely. The alarm apparatus 34 in FIG. 1 issues an alarm for example when the probability given by the target output in step a16 exceeds 50 percent. The cruise control apparatus 35 applies braking to limit the traveling velocity of the vehicle 33 when the probability becomes 70 to 80 percent.

Figure 3B:
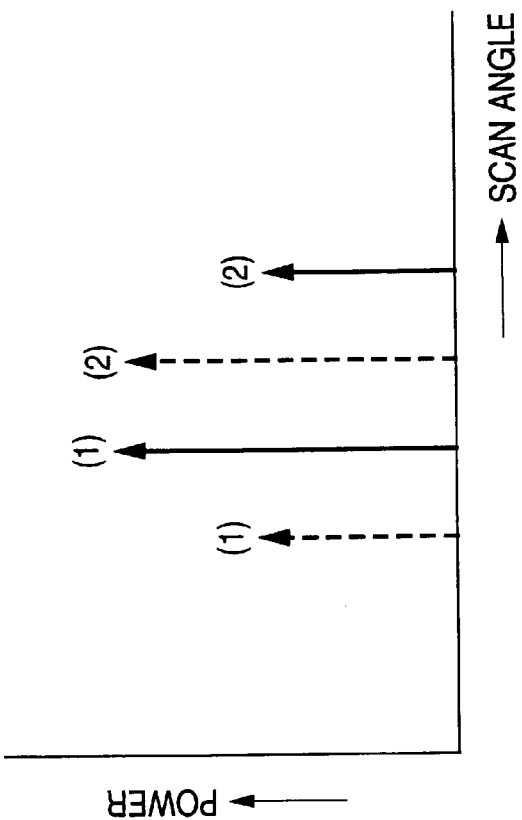
FIGS. 3A and 3B are diagrams showing a philosophy that detects the target direction in a plurality of scans as the second embodiment of the invention.
Figure 3A:
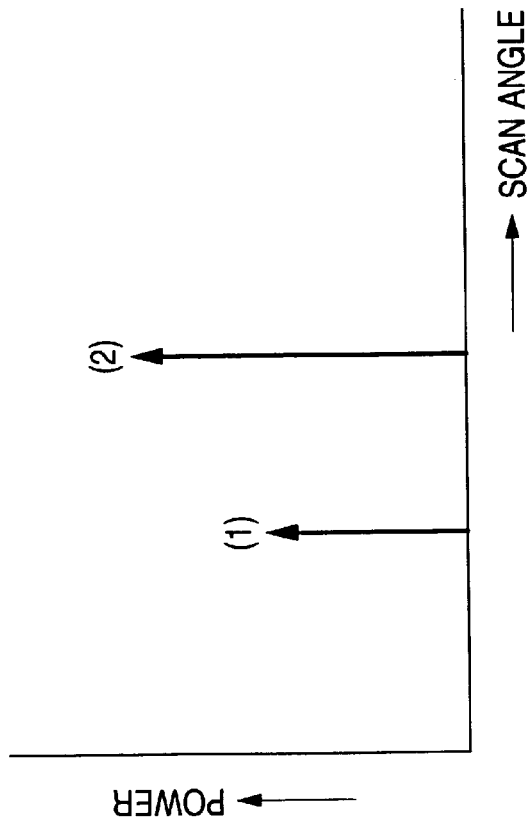

FIGS. 3A and 3B show an example of variation in the reflected signal level the scanning mechanism 24 obtains by transmitting the exploration signal and receiving the reflected signal while detecting the beam direction 23a of the antenna 23 as an angle via the direction detecting apparatus 36. FIG. 3A shows the variation obtained by scanning in a single direction. FIG. 3B shows the exploration results obtained when the beam direction for exploration in the go and return directions is shifted by predetermined angle. In FIG. 3B, a solid line shows the detection results in the current scan and a broken line shows the detection results in the preceding scan.

In case the target direction is determined based on the detection results shown in FIGS. 3A and 3B, target detection is not performed only in at two angles in FIG. 3A so that it has to be determined that the angle (2) having a higher power of reflected wave is the target direction. When data in two scans with different angle setting is used as shown in FIG. 3B, it is understood that the actual angle of the target lies between the angle (2) in the preceding scan and the angle (1) in the current scan. In this embodiment, even if the interval of the angle of exploration is relatively large, the angle of exploration is shifted from first scan to second scan, thus obtaining a high-accuracy exploration results same as those obtained via exploration in intervals of a smaller angle.

Figure 4:
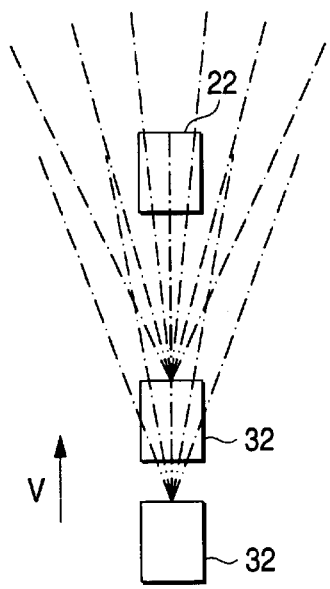
FIG. 4 is a diagram showing a philosophy that considers the relative travel of a target in using the data obtained in a plurality of scans.

FIG. 4 shows an example of variation the relative position assumed when exploration of the target 22 is performed in a plurality of scans. Generally a velocity difference is present between the target 22 and the vehicle 32. The scanning mechanism 24 scans the antenna 23 over a period of about 100 ms per scan for example within the allowance of ±4 degrees. When exploration is performed in two scans, a relative travel of about 0.2 seconds exists between the position of the initial vehicle 32 and the position of the final vehicle 32. Thus the target 22 moves relatively to the vehicle 32. In step a9 in FIG. 2, the Doppler shift frequency is calculated from the relative velocity difference based on the aforementioned expression 4. Then the upbeat frequency and the downbeat frequency based on expressions 1 and 2 are corrected based on the calculated Doppler shift frequency. In step a10, the data corrected according to the variation in the Doppler shift frequency is divided per specific section. In step a11, calculation is performed based on the range R obtained from the aforementioned expression 3 and the corresponding direction in each specific section. Instep a12, the section where target positions assemble as a results of position calculation in step a11 is determined as a shoulder.

In the procedure from step a9 through step a12, data that cannot be paired in step 8 is processed as an unwanted reflective object such as a guard rail for determining the shoulder position. However, since such an unwanted reflected object is not a major obstacle to traveling of a vehicle, data determined not to be paired may be excluded from processing and not treated as a target. This reduces the processing load.

Figure 5:
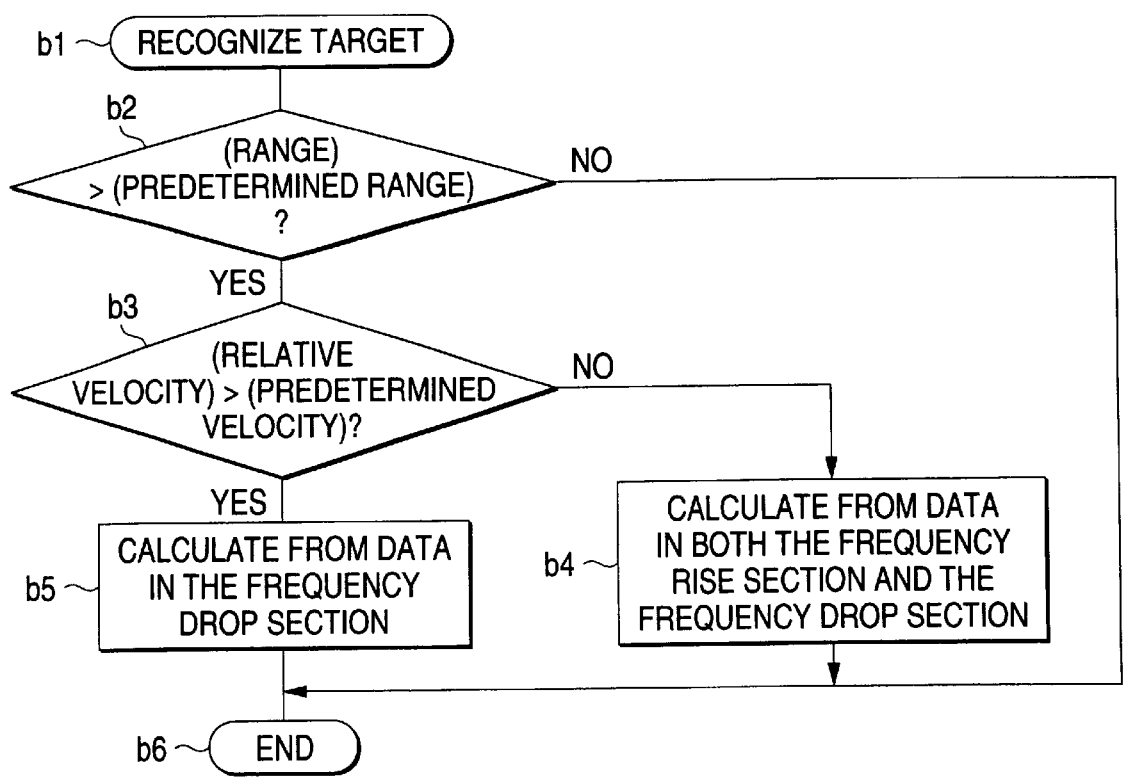
FIG. 5 is a flowchart showing a procedure for estimating the range and the relative velocity to a target that is approaching at a high relative velocity as the third embodiment of the invention.

FIG. 5 shows the procedure for estimating the position of the target 22 and the relative velocity in case the vehicle 32 approaches the target 22 at a high speed, as the third embodiment of the invention. After the target is recognized in step b1, it is determined whether or not the range is shorter than the reference range in step b2. In case it is determined that the range is shorter than the reference range, it is determined whether or not the relative velocity is higher than the reference velocity. In case it is determined that the range is not smaller than the reference range in step b2, or in case it is determined that the relative velocity is not higher than the reference velocity in step b3, the range and the relative velocity to the target 22 are calculated using the data in the frequency rise section and the frequency drop section in step b4, same as the typical FM-CW system. In case it is determined that the relative velocity is higher than the reference velocity in step b3, data in the frequency drop section alone is used to estimate the range and the relative velocity to the target 22 in step b5. When step b4 or step b5 terminates, the procedure terminates with step b6.

Figure 6:
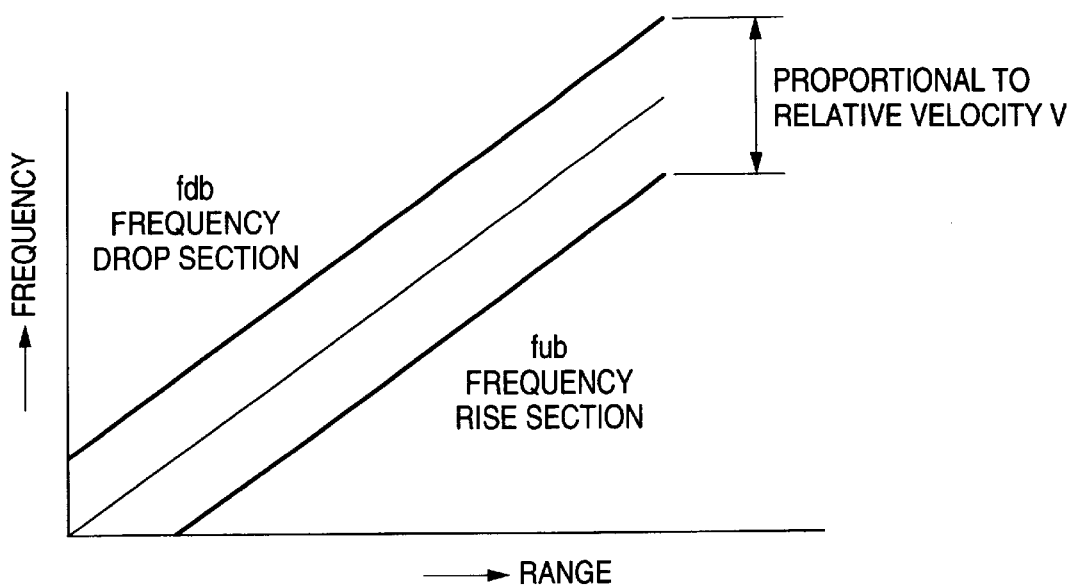
FIG. 6 is a graph showing a reason for estimating the range and the relative velocity to a target that is approaching at a high relative velocity by using the frequency drop section.

FIG. 6 shows the variation with the range between the upbeat frequency fub and the downbeat frequency fdb in exploring a target in the FM-CW system. From expressions 1 and 2, it is understood that the difference between the downbeat frequency fdb and the upbeat frequency fub is double the Doppler shift frequency fd. From expression 4, it is understood that the Doppler shift frequency fd corresponds to the relative velocity V. Thus it is understood that the difference between fdb and fub is proportional to the relative velocity V. Thus, when the relative velocity is relatively high, the upbeat frequency fub considerably decreases as the range to the target decreases. In the receiver circuit 26 shown in FIG. 1, processing of an extremely low frequency is difficult. Thus, in this embodiment, as the range to the target is shorter than for example the reference range as d1, the upbeat frequency fub in the frequency rise section is not used but only the downbeat frequency fdb in the frequency drop section is used to determine the range and the relative velocity to the target, when the relative velocity is higher than the reference velocity V1. The value obtained in step b4, same as the typical FM-CW system, is used is used as the relative velocity to obtain the Doppler shift frequency fd in expression 4. From the relation to the downbeat frequency in expression 2, the range frequency fr is obtained and the range R is calculated from expression 3 in order to estimate the relative velocity V and the range R.

Figure 7:
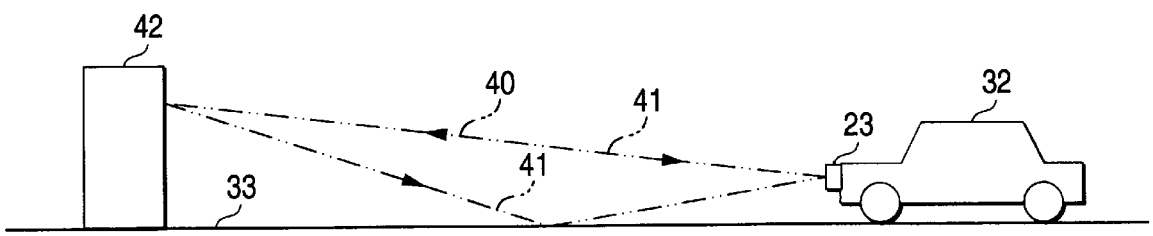
FIG. 7 is a diagram showing a philosophy that determines whether or not the target can be cleared depending on whether or not a variation in the receiving level of the reflected signal appears due to effects of a multipath error.

FIG. 7 shows an example of a philosophy that determines whether or not a stationary object on the road can be cleared in an approach to the object as the fourth embodiment of the invention. When a target 42 where an exploration signal 40 transmitted from an antenna 23 of the vehicle 32 reflects to become a reflected signal 41 is relatively higher than the road surface 43, a multipath error takes place. The reflected signal 41 is either a signal directly received by the antenna 23 or a signal reflected off a road surface 43 and received by the antenna 23. This causes a phase difference between reflected signals 41 that are received based on the path difference. When the reflected signals 41 cancel each other due to this phase difference, the reflected signal level drops.

Figure 8A:
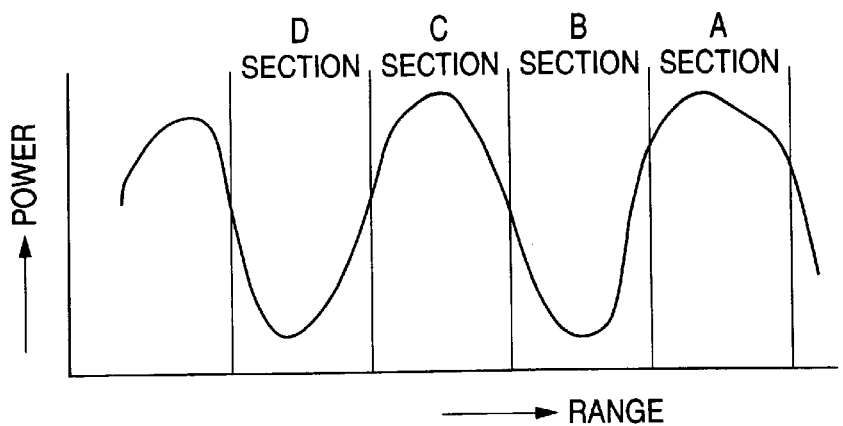
FIGS. 8A and 8B are graphs showing the state where the difference of effects of a multipath error occurs depending on the height of the target.
Figure 8B:
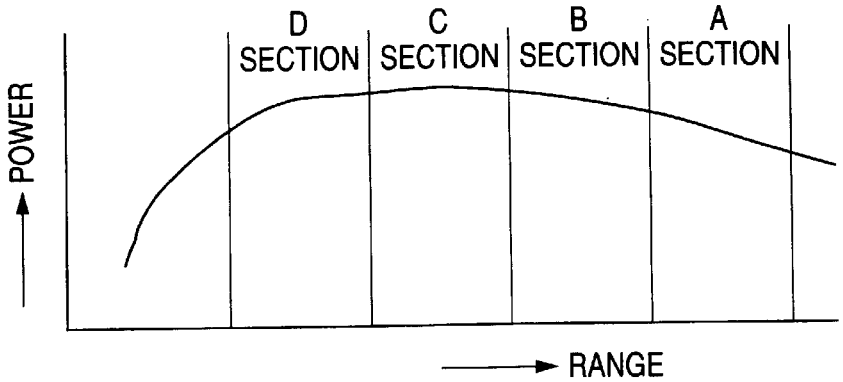

FIGS. 8A and 8B show a difference of the signal level aused by the height of the target 42 from the road surface 43 when the signal level of the reflected signal 41 relative to the range is represented as a power. FIG. 8A shows the variation in the power of the reflected signal 41 from the relatively high target 42. FIG. 8B shows the variation in the power of the reflected signal 41 from the relatively low target 42. When the target 42 is high, the variation in the power relative to the range is large due to effects of a multipath error.

In step a22 in FIG. 2, comparison of the power is made for example between Section A and Section B in FIG. 8A and 8B, and in step a24, comparison of the power is made for example between Section C and Section D in FIG. 8A. An example of the range of each Section A, B, C or D is 20 meters. In case the power varies affected by a multipath error, it can be determined that the target 42 is high and the probability of the vehicle clearing the target is very small. In case the target 42 is low as shown in FIG. 8B, the power increases as the range becomes shorter up to a certain range. Thus it is impossible to establish the conditions for step a22 and step a24 on comparison of the power between sections that corresponds to sections A, B, C, and D in FIG. 8A.

Figure 9:
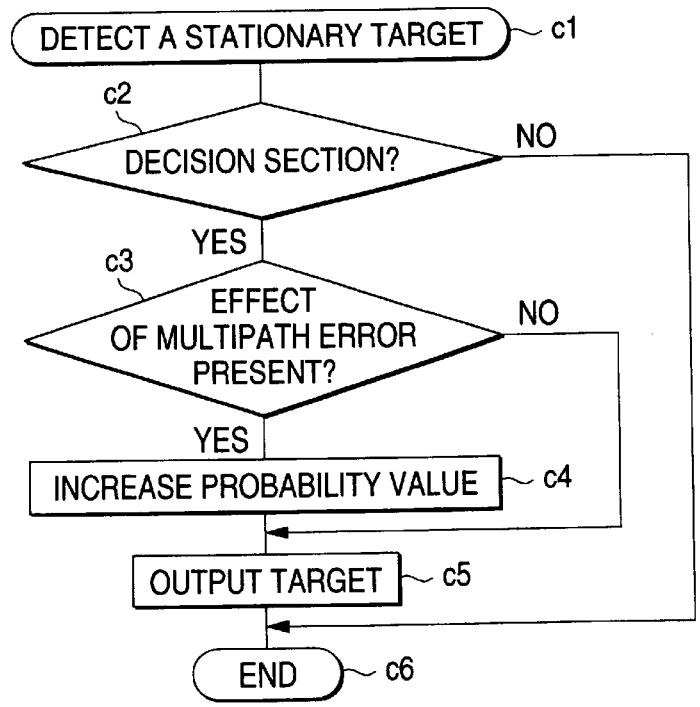
FIG. 9 is a flowchart for determining whether or not a stationary target can be cleared in a plurality of sections in an approach from a long range as the fifth embodiment of the invention.

FIG. 9 shows a procedure for determining whether or not a stationary object can be cleared as the fifth embodiment of the invention. When a stationary target is detected in step c1, it is determined whether or not the vehicle is in the section where it is determined whether or not the target can be cleared in step c2. In step c3, it is determined whether or not the level of the reflected signal from the target varies with the range and is affected by a multipath error like in step a22 and step a24 in FIG. 2. In case it is determined that the reflected signal level is affected by a multipath error, the probability value is increased in step c4. After the probability value is increased in step c4, or after the probability value is not increased in step c3 since the reflected signal level is not affected by a multipath error, target output is performed in step c5, same as step a16 in FIG. 2 and an alarm is issued based on the probability value from the alarm apparatus 34 in FIG. 1 or braking control is made by the cruise control apparatus 35 in FIG. 1. After the target output terminates in step c5, or when the vehicle is not in the section for determination in step c2, the procedure terminates with step c6. According to this embodiment, a plurality sections for decision are provided as the vehicle approaches from a long range and decision is made from an early period in order to secure safety and correct decision at the next range.

It is also possible to detect the height of a target from occurrence of a multipath error and the range to the target.

Each of FIGS. 10A and 10B shows a philosophy that determines the height of a stationary target as the sixth embodiment of the invention. FIG. 10A shows a state in which the vehicle 32 approaches targets 44, 45 present ahead of the raveling vehicle on the road surface 43. It is assumed that the target 44 is lower than the target 45 from the road surface 43. As shown in FIG. 10A, the beam direction 23a from the antenna 23 of the vehicle 32 is spread to a certain extent so that an exploration signal reaches both targets 44, 45 when the range to the targets 44, 45 is relatively long, and the reflected signal is received by the antenna 23. As shown in FIG. 10B, as the vehicle approaches the targets 44, 45, the beam direction 23a of the antenna 24 extends forward from the position apart from the road surface 43. Thus the low target 44 goes beyond the limits of the beam direction 23a.

Figure 11A:
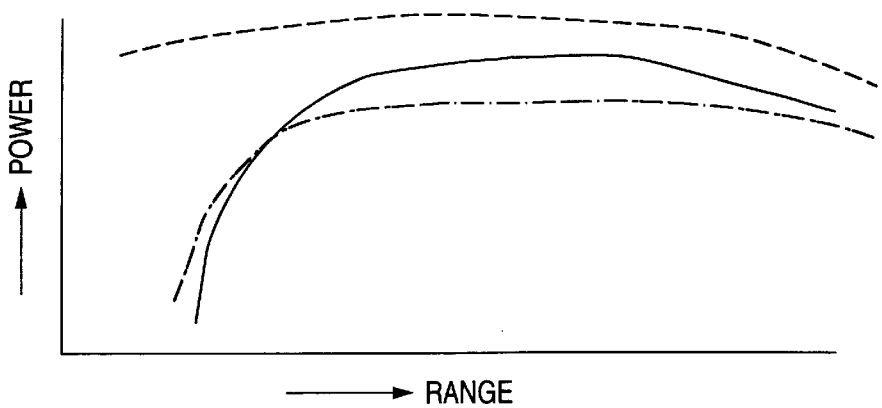
FIGS. 11A to 11C are graphs showing the relationship between the range and the reflected signal level in an approach to an stationary target that can be cleared.

FIG. 11A shows the variation in the receiving power of the reflected signal with the range obtained when the vehicle 32 shown in FIGS. 10A and 10B approaches the targets 44, 45. A solid line shows the variation in the power of the reflected signal from the low target 44 and a broken line shows the variation in the power of the reflected signal from the high target 45. The high target 45 may not be high enough to be affected by a multipath error shown in FIGS. 8A and 8B at long range. According to this embodiment, it is possible to recognize the difference of height from the difference of drop in the receiving level due to difference of height and to estimate the height of the targets 44, 45 based on the installation position of the antenna 23. To determine whether the target 44 can be cleared by the vehicle 32, a relation map maybe prepared as a threshold value that uses an alternate long and short dash line to indicate the variation in the receiving level for a height that can be cleared. In case the reflected signal level drops below the threshold value, it is determined that the target can be cleared. It is also possible to estimate the height of the target 44 using as a reference the maximum height to be cleared that is a threshold value.

Figure 11B:
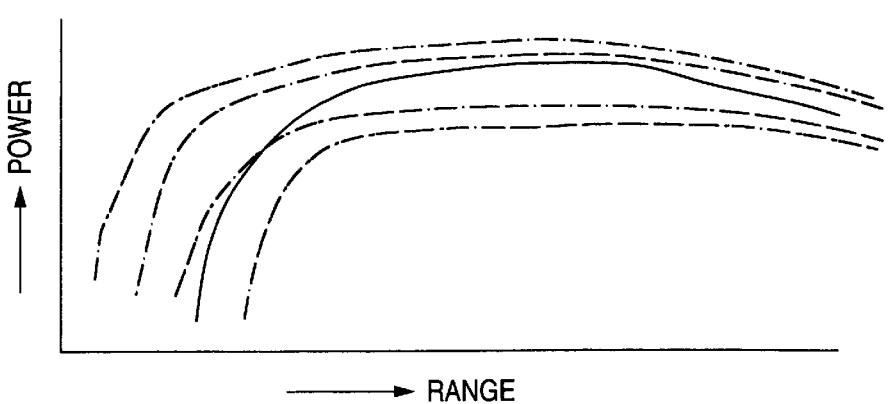
Figure 11C:
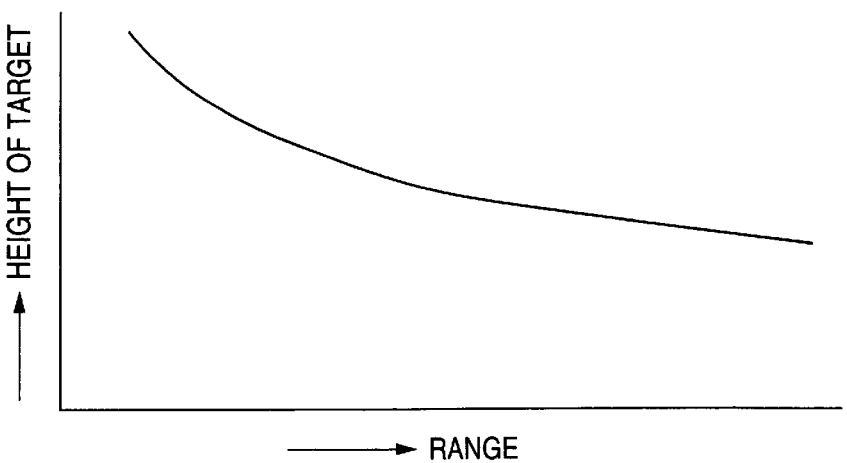

As shown in FIG. 11B, in case a plurality of maps that show different curves are provided, the approximate height of the target can be determined from a map that best matches the actual drop in the receiving power. As shown in FIG. 11C, it is also possible to obtain the height of the target from the range R where the receiving level has dropped below the predetermined value P (is beyond the lower beam detection limit) at short range.

Figure 12:
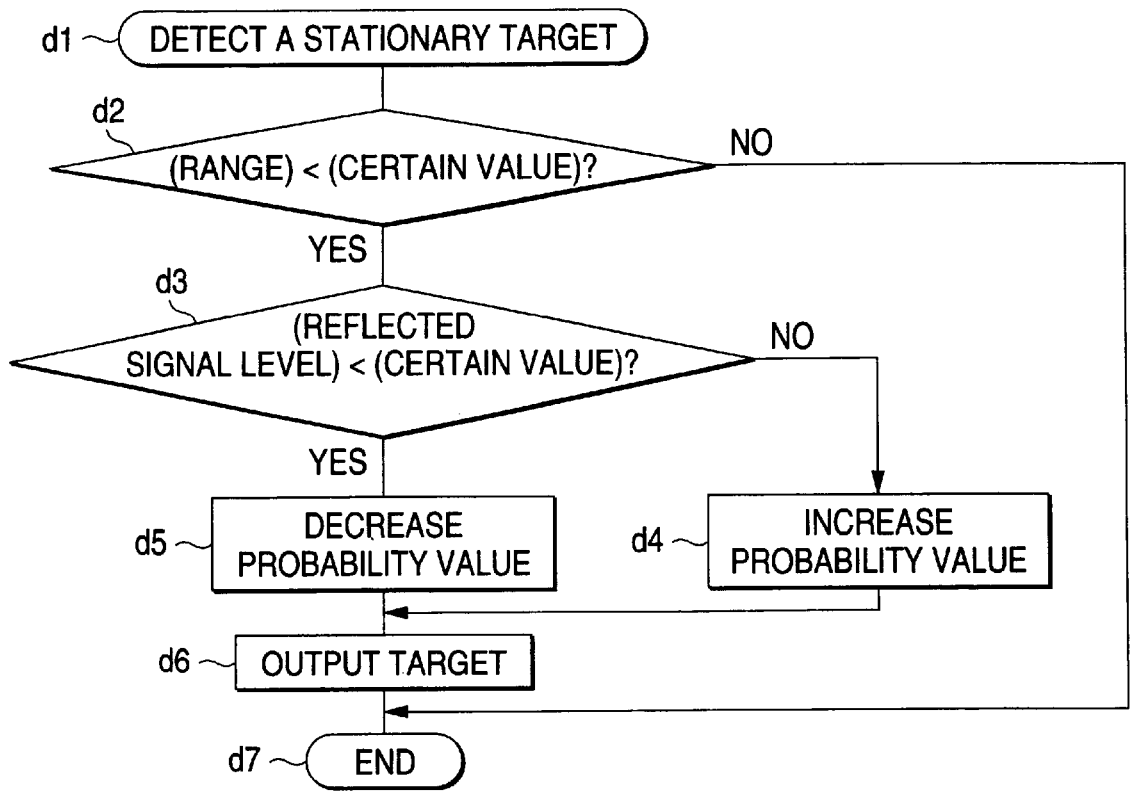
FIG. 12 is a flowchart showing a procedure of another philosophy that determines whether or not a stationary target can be cleared.

FIG. 12 shows a procedure for determining whether or not a target can be cleared based on the philosophy according to this embodiment. When a stationary target is detected in step d1, it is determined whether or not the range to the stationary target is shorter than a certain value in step d2. In case it is determined that the range is short, it is determined whether or not the reflected signal level is lower than a certain value in step d3. In case the level is not lower, it is little possible that the stationary target can be cleared, and the probability value is increased in step d4. In case the reflected signal level drops below the certain value in step d3, it is highly possible that the stationary target can be cleared, and the probability value is decreased in step d5. Same as step a16 in FIG. 2, target output is performed in step d6. In case the probability value exceeds 50 percent in target output, an alarm is issued from the alarm apparatus 34 in FIG. 1. In case the probability value rises to 70 to 80 percent, braking is applied by the cruise control apparatus 35. After the target output terminates in step d6, or when it is determined that the range is not smaller than the certain value in step d2, the procedure terminates with step c7. The certain value used to determine the range in step d2 is a range where the low target 44 goes beyond the limits of the beam direction 23a of the antenna 23.

The decision processing shown in FIG. 12 is inserted after step a25 in FIG. 2. It is possible to increase or decrease the probability value depending on whether or not the target can be cleared.

Figure 13:
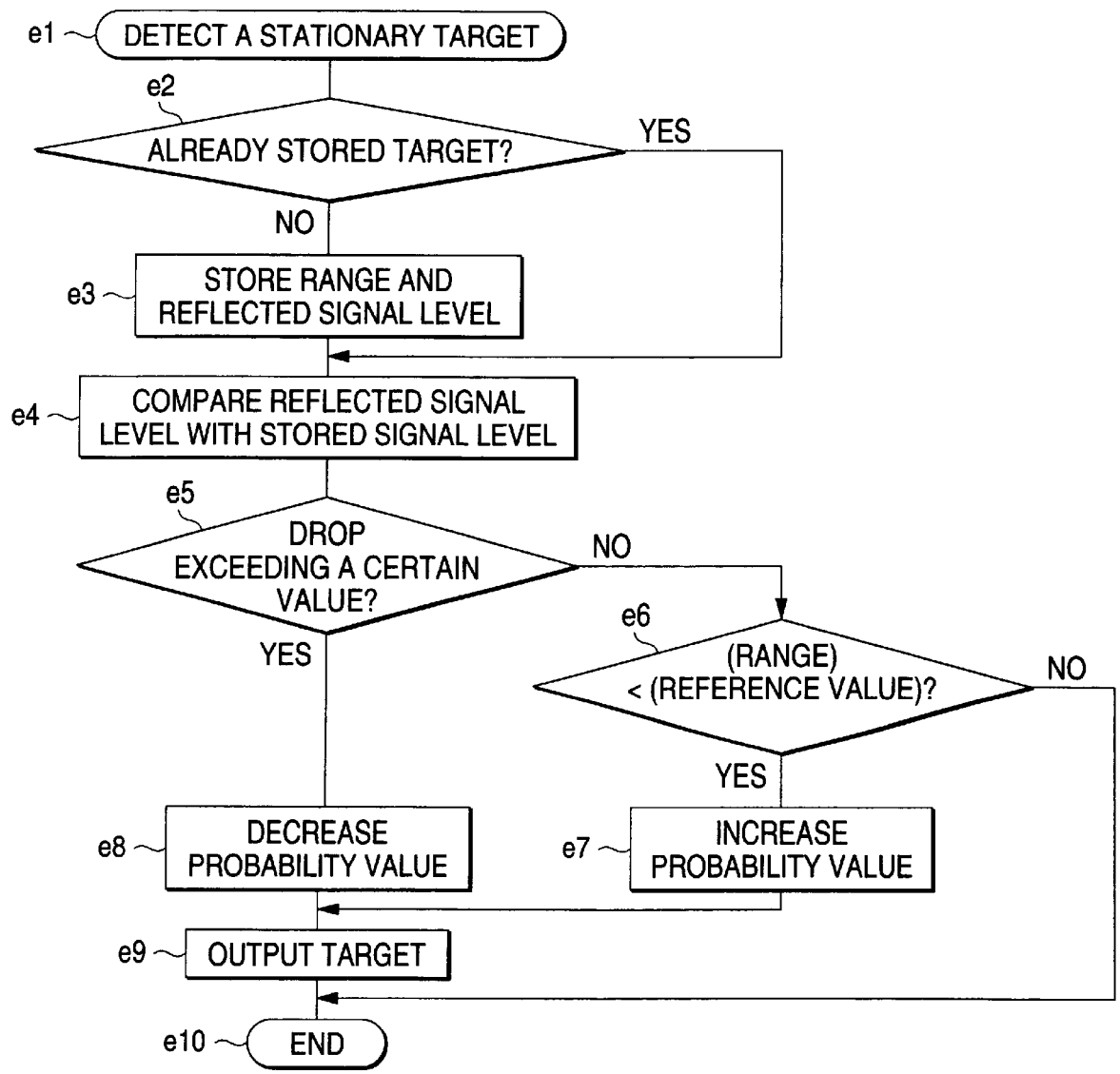
FIG. 13 is a graph showing another philosophy that determines whether or not a stationary target can be cleared from a drop in the reflected signal level in an approach compared with the reflected signal level at long range as the seventh embodiment of the invention.

FIG. 13 shows a procedure for determining the drop in the reflected signal level shown in FIGS. 11A to 11C using a level at long range as a reference, as the seventh embodiment of the invention. After a stationary target is detected in step e1, it is determined whether or not the target has been already stored in step e2. In case the target has not been stored, the range to the stationary target and the reflected signal level are stored in the memory 31 in FIG. 1 in step e3. In case the target has been stored instep e2, execution proceeds to step e4. In step e4, the reflected signal level is compared with the stored signal level. In step e5, it is determined whether or not a drop exceeding a certain amount is found from the comparison results. In case it is determined that a drop exceeding a certain amount is not found, it is determined whether or not the range is shorter than the reference value in step e6. This range is determined correspondingly to the range where the target 44 shown in FIG. 10B goes beyond the beam direction 23a. In case it is determined that the range is shorter than the reference value in step e6, the probability value is increased in step e7. In case it is determined that a drop exceeding a certain amount is found in step e5, the probability value is increased in step e8. Based on the probability value varied in step e7 or e8, target output is performed in step e9. This target output is performed same as step a16 in FIG. 2. In case it is determined that the range is not shorted than the reference value in step e6, or after target output is performed in step e9, the procedure terminates with step e10.

In this embodiment, it is determined whether or not a drop exceeding a certain amount is found by using a reflected signal level at long range as a reference in step e4. While the reflected signal level varies with the target material, the level is less subject to effects of the target material according to this embodiment. It is determined whether or not a stationary target can be cleared depending on whether or not a certain amount of drop is found before the range becomes shorter than the reference value. Since the range where a drop amount exceeds a certain amount corresponds to the height of the stationary target, it is possible to estimate the height of the stationary target from the range where a drop exceeding the certain amount.

This embodiment is executed next to step a25 in FIG. 2. Storage of the reflected signal level for the range in step e2 must be made per stationary target.

Figure 14A:
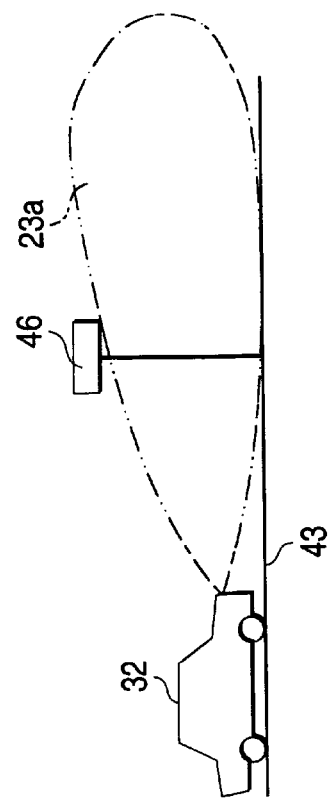
FIGS. 14A and 14B are diagrams showing a philosophy that determines that a stationary target is one in a position higher than the position where the vehicle travels, such as a billboard, as the eighth embodiment of the invention.
Figure 14B:
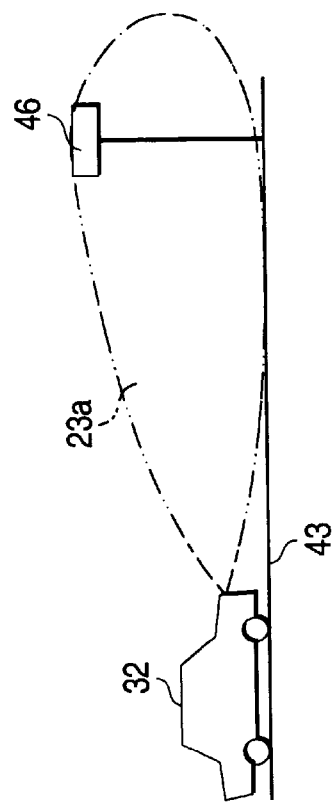

FIGS. 14A and 14B show a philosophy that determines a stationary target that does not obstruct the traveling of the vehicle as the eighth embodiment. In case a billboard 46 is present in the proximity of the road surface 43 where the vehicle 32 is traveling, as shown in FIG. 14A, a billboard 46 is in the beam direction 23a of the antenna 23 at relatively long range, thus a relatively high reflected signal level can be received. As shown in FIG. 14B, as the vehicle approaches the billboard 46, the billboard 46 is beyond the beam direction 23a of the antenna 23 so that the reflected signal level suddenly drops.

Figure 15:
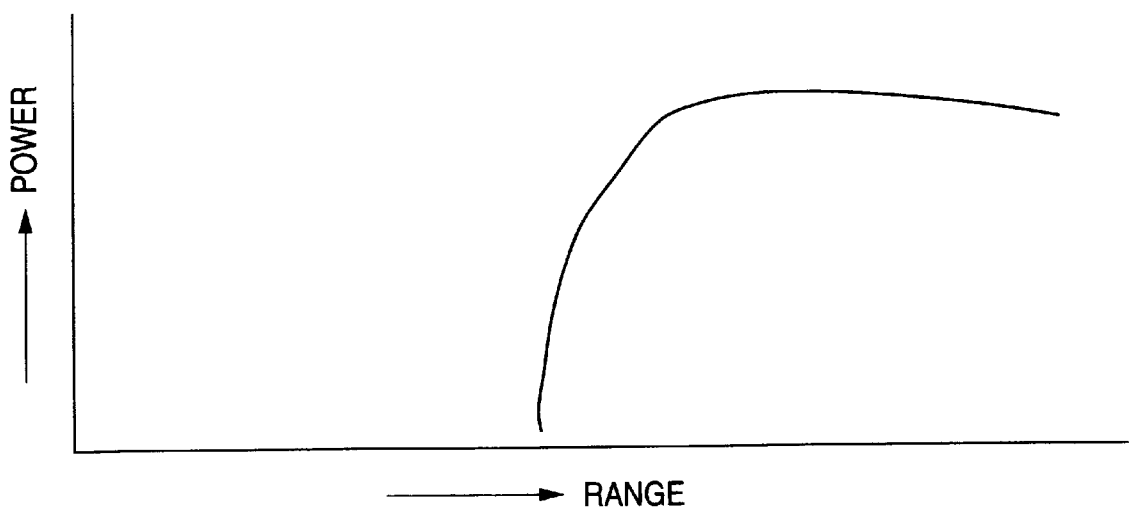
FIG. 15 is a graph showing the variation with the range in the level of the reflected signal from a stationary target placed in a high position as shown in FIGS. 14A and 14B.
Figure 16:
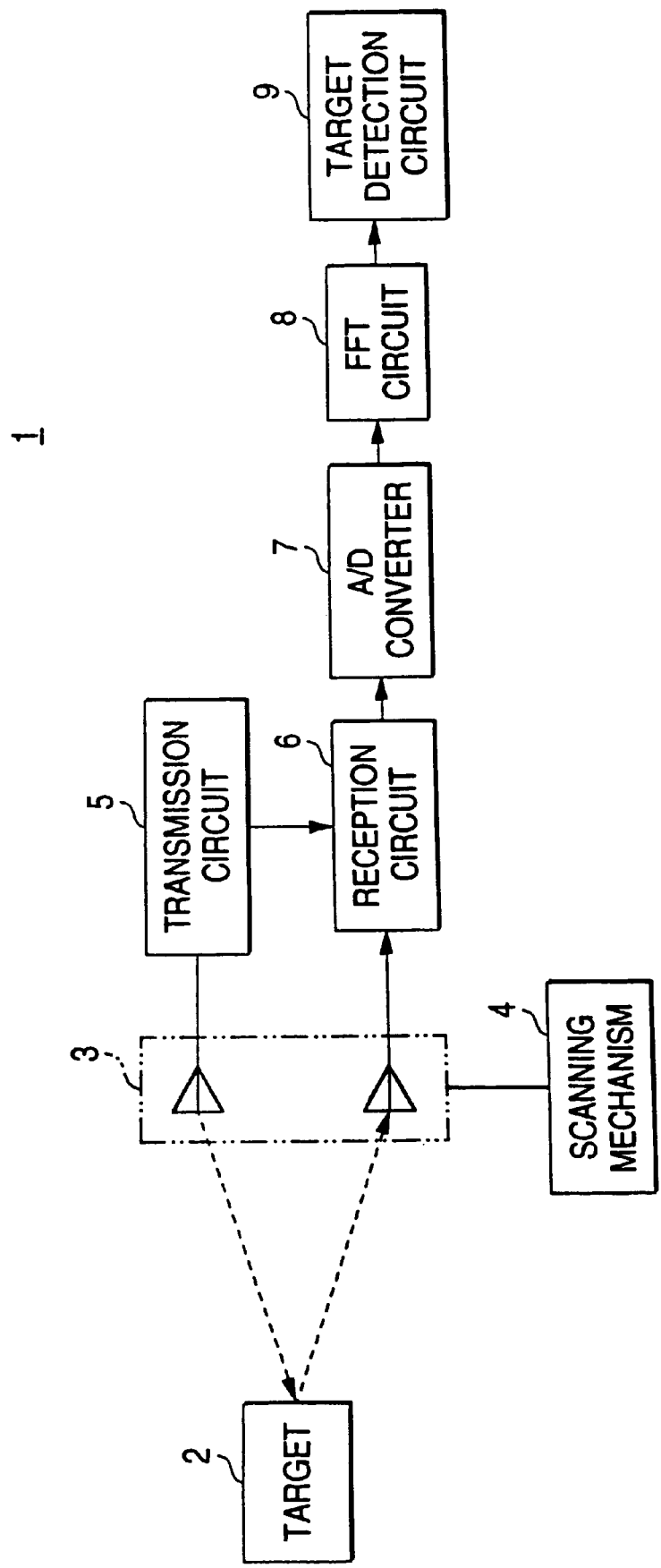
FIG. 16 is a schematic block diagram showing an electrical configuration of conventional motor-vehicle-mounted radar apparatus.
Figure 17A:
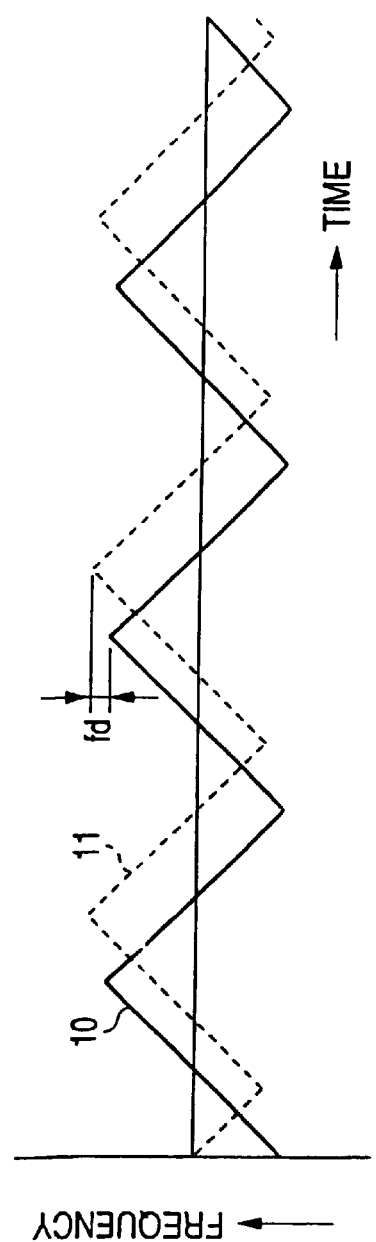
FIGS. 17A and 17B are graphs showing the operation principle of motor-vehicle-mounted radar apparatus of the FM-CW system.
Figure 17B:
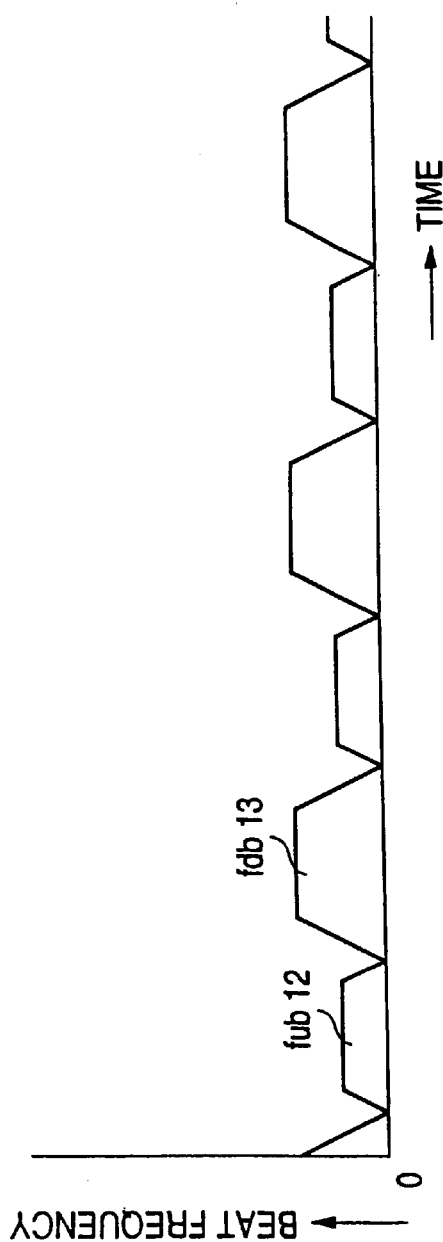

FIG. 15 shows the relationship between the power of the reflected wave and the distance obtained while the vehicle 32 is approaching the billboard 46. The power of the reflected signal is relatively high in the state shown in FIG. 14A and suddenly drops in the state shown in FIG. 14B. As shown in FIG. 15, the range where the reflected signal power suddenly drops in an approach to a high target is much longer than the range reflected signal power suddenly drops in an approach to a low target. Decreasing the probability value in step a21 in case the power at relatively long range suddenly drop is based on the philosophy of this embodiment. In this embodiment, the height of the lowest section of the target is detected and, based on this data, it is determined that the vehicle can pass through the target. On the other hand, the decision on whether or not the target can be cleared is made based on the height of the highest section of the target.

Also in this embodiment, it is possible to obtain the height of the target by using maps shown in FIG. 11B and FIG. 11C.

As mentioned earlier, according to the invention, it is possible to obtain the target direction with high accuracy in a plurality of scans while shifting the exploration angle, without increasing the exploration count in a single scan. Since the exploration count in a single scan is not increased, no high-speed operation processing is required and it is possible to obtain the target direction with high accuracy via relatively low costs.

According to the invention, in case a single scan uses a large number of beam directions where the reflected signal is obtained from the target, target recognition is made based on the exploration results of a single scan. This allows the target position to be calculated quickly. In case a single scan uses a small number of beam directions where the reflected signal is obtained from the target, target exploration is performed using a combination of beam directions that are different from scan to scan in a plurality of scans. This allows the target direction to be obtained with high accuracy.

According to the invention, the Doppler shift frequency is calculated from the frequency shift amount that accompany the travel of the target in calculating the target position with a combination of a plurality of scans in order to vary the reflected signals combined for recognition depending on the calculation results. This allows the range and the relative velocity to the target obtained from a plurality of scans to be obtained with high accuracy.

According to the invention, the exploration results that cannot be combined as the reflected signal from the target in a plurality of scans possibly correspond to a guard rail and are not treated as the reflected signal from the target. This reduces the processing load.

According to the invention, from the exploration results that cannot be combined in a plurality of scans, the Doppler shift component of the velocity of the vehicle is subtracted to calculated the range and the direction. This allows the position of a guard rail with high accuracy.

According to the invention, calculation results obtained by subtracting the Doppler shift component of the velocity of the vehicle are recognized as data on an unwanted reflective object and the position where unwanted reflecting objects assemble is obtained and the position is determined as a shoulder. This avoids alarms and braking control on objects on or beyond a shoulder and thus unwanted deceleration.

According to the invention, the target height is determined based on the effects of a multipath error eminent when the target is high. Thus it is determined that a target unaffected by a multipath error can be possibly cleared thus avoiding unwanted deceleration and alarms.

According to the invention, the decision on whether or not a stationary target can be cleared is secured via a simple configuration, taking advantage of the phenomenon that the position of an antenna transmitting an exploration signal and receiving a reflected signal has a certain height from the road surface and a target lower than this height goes beyond the antenna beam direction as the vehicle approaches the target to a certain range.

According to the invention, the decision on whether or not a stationary target can be cleared is made with ease by using a threshold value on a map prepared in advance.

According to the invention, receiving level threshold value maps are provided in advance for the range as a criteria for a drop in the receiving level of the reflected signal from a target based on the fact that the target is below the beam direction of the antenna, in order to determine the height of the target at a range where the level of the reflected signal from the target drops below the threshold value. This allows a decision on the target height to be performed quickly.

According to the invention, it is determined that a target can be cleared when a drop in the reflected signal level in approaching a stationary target reaches a certain value compared with the reflected signal level at long range. This allows a high-accuracy decision to be made irrespective of the difference of target material.

According to the invention, the height of a stationary target is estimated depending on the range where the reflected signal level that varies depending on the range from the target has dropped below a certain level compared with the level at long range. When the target is relatively low, the exploration beam does not cover the target thus avoiding a drop in the reflected signal level. In case the target is relatively high, the beam is directed off the target only when the vehicle has approached the target at shirt range, thus reducing the range where the drop in the reflected signal starts. The target height is estimated depending on the range. This allows the target height to be estimated understandably and easily, and the target height to be estimated with high accuracy without being affected by the variation in the reflected signal level caused by the target material.

According to the invention, a correct decision is made on a target that is placed in a sufficiently high position from the road surface, such as a billboard, detected at relatively long range and having the reflected signal level suddenly dropping in an approach. This avoids unwanted alarms and braking.

According to the invention, it is possible to determine the possibility of clearing the target from the height of the highest section of the target.

According to the invention, it is possible to determine whether or not the target can be cleared from the height of the highest section of the target. This assures a high-accuracy decision.

According to the invention, it is possible to determine the possibility of passing through the target from the height of the lowest section of the target.

According to the invention, it is possible to determine whether or not the target can be passed through from the height of the lowest section of the target. This assures a high-accuracy decision.

According to the invention, the possibility of clearing the target is determined in a plurality of sections in an approach to the target. This allows the target to be cleared without such control as deceleration. In case it is determined that the target can be possibly cleared at relatively long range.

According to the invention, it is possible to estimate with high accuracy the range and the position to a target that is approaching rapidly.

What is claimed is:

1. A radar apparatus mounted on a vehicle for exploring a target around the vehicle, the radar apparatus comprises:

an antenna having a high gain in a predetermined beam direction, for transmitting an exploration signal in the beam direction and receiving a reflected signal by the target in the exploration signal;

a scanning section for change the beam direction into a plurality of beam directions of the antenna within a predetermined limit to perform a scan;

a direction detecting section for detecting the beam direction varied by the scanning section;

an exploration control section for controling the scanning section to repeatedly change the beam direction of the antenna into the plurality of beam direction with in the predetermined limit and to explore the target in the plurality of beam directions different from each other; and a target recognizing section for calculating a range to the target based on the reflected signal from the target received by the antenna and the exploration signal transmitted from the antenna, the target recognizing section for recognizing the target based on the range to the target and the beam direction of the antenna detected by the direction detecting section.

2. The radar apparatus according to claim 1, wherein the target recognizing section recognizes the target based on exploration results in the plurality of beam directions and recognizes the target based on a combination of the exploration results obtained from a plurality of prespecified scans when the number of beam directions, in which the reflected signal is received, is smaller than a prespecified reference value.

3. The radar apparatus according to claim 2, wherein the target recognizing section calculates a Doppler shift frequency from a frequency shift amount according to a traveling of the target based on the exploration results obtained from the plurality of beam directions and changes a reflected signal to be combined for target recognition depending on the calculation results.

4. The radar apparatus according to claim 3, wherein the target recognizing section recognizes the reflected signal having a frequency excluded from the combination depending on the exploration results as an undesired reflected signal from a undesired reflecting object, not as a desired reflected signal from the target.

5. The radar apparatus according to claim 3, wherein the target exploration is performed via the FM-CW system; and
the target recognizing section subtracts the Doppler shift component of a velocity of the vehicle from peak data obtained from the reflected signal having a frequency excluded from the combination depending on the exploration results in a frequency rise section and a frequency drop section of the FM-CW system to calculate the range and the direction.

6. The radar apparatus according to claim 5, wherein the target recognizing section recognizes the calculation results of the range and direction as data on an undesired reflecting object and obtains a position, where the undesired reflecting object assembles, from the range and the direction, and determines the position of the undesired relecting object as a shoulder.

7. A radar apparatus mounted on a vehicle for exploring targets around the vehicle, the radar apparatus comprising:
an antenna having a high gain in a predetermined beam direction, for transmitting an exploration signal in the beam direction and receiving a reflected signal by the target in the exploration signal;
a direction detecting section for detecting the beam direction of the anntena; and
a target recognizing section for calculating a range to a target based on the reflected signal from the target received by the antenna and the exploration signal transmitted from the antenna, the target recognizing section for recognizing the target based on the range to the target and the beam direction of the antenna detected by the direction detecting section, the target recognizing section for determining a height of the stationary target depending on whether or not a multipath error has an effect on variation in a level of the reflected signal within a specific frequency due to the range to the target.

8. The radar apparatus according to claim 7, wherein the target recognizing section determines that the stationary target can be overcome if the level of the reflected signal from the target suddenly drops in an approach to the target.

9. The radar apparatus according to claim 7, wherein the target recognizing section has data indicating variation of a threshold value of the reflected signal level for the range in advance and determines that the stationary target can be overcome if the level of the reflected signal from the target has dropped below the threshold value within a predetermined limits of range.

10. A radar apparatus mounted on a vehicle for exploring a target around the vehicle, the radar apparatus comprising:
an antenna having a high gain in a predetermined beam direction, for transmitting an exploration signal in the beam direction and receiving a reflected signal by the target in the exploration signal;
a direction detecting section for detecting the beam direction of the anntena; and
a target recognizing section for calculating a range to the target based on the reflected signal from the target received by the antenna and the exploration signal transmitted from the antenna, the target recognizing section for recognizing the target based on the range to the target and the beam direction of the antenna detected by the direction detecting section, the target recognizing means having data indicating variation in a threshold value of a level of the reflected signal for the range in advance, the target recognizing section for determining that a height of the target is below the threshold value based on the range where the reflected signal from the stationary target.

11. The radar apparatus according to claim 10, wherein the target recognizing section determines whether or not the stationary target can be cleared based on a state in which the level of the reflected signal decreases as the range gets shorter.

12. The radar apparatus mounted on a vehicle for exploring a target around the vehicle, the radar apparatus comprising:
an antenna having a high gain in a predetermined beam direction, for transmitting an exploration signal in the beam direction and receiving a reflected signal by the target in the exploration signal;
a direction detecting section for detecting the beam direction of the anntena; and
a target recognizing section for calculating a range to the target based on the reflected signal from the target received by the antenna and the exploration signal transmitted from the antenna, the target recognizing section for recognizing the target based on the range to the target and the beam direction of the antenna detected by the direction detecting section, the target recognizing section for determining a height of the stationary target based on the range where a level of the reflected signal suddenly drops in an approach to the target.

13. A radar apparatus mounted on a vehicle for exploring a target around the vehicle, the radar apparatus comprising:
an antenna having a high gain in a predetermined beam direction, for transmitting an exploration signal in the beam direction and receiving a reflected signal by the target in the exploration signal;
a direction detecting section for detecting the beam direction of the anntena; and
a target recognizing section for calculating a range to the target based on the reflected signal from the target received by the antenna and the exploration signal transmitted from the antenna, the target recognizing section for recognizing the target based on the range and the beam direction of the antenna detected by the direction detecting section,
wherein the target recognizing section recognizes that the target is not a target having a height to be alerted for traveling of the vehicle if a level of the reflected signal exceeds the prespecified reference while the target recognizing section is recognizing the stationary target at longer range than the predetermined range and the level of the reflected signal drops considerably as the vehicle approaches the target from the vehicle position at the time of recognition.

14. The radar apparatus according to claim 7, wherein the height of the target is a height of the highest section of the target.

15. Motor-vehicle-mounted radar apparatus according to claim 14, wherein the target recognizing section determines whether or not the target can be cleared based on the determined height.

16. The radar apparatus according to claim 10, wherein the target height is a height of the lowest section of the target.

17. The radar apparatus according to claim 16, wherein the target recognizing section determines whether or not the target can be passed through based on the determined height.

18. The radar apparatus according to claim 14, wherein the target recognizing section determines the height of the targete in a plurality of sections depending on the range to the target and derives a signal for a predetermined alarm and/or braking based on results for each section.

19. The radar apparatus according to claim 1, wherein the target exploration is performed via the FM-CW system and that the target recognizing section uses only data in the frequency drop section to estimate the range and the relative velocity to the target when the target recognizing section determines that the relative velocity to the target is larger than the reference velocity.

* * * * *